(12) United States Patent
Newman

(10) Patent No.: US 11,080,659 B2
(45) Date of Patent: *Aug. 3, 2021

(54) SYSTEMS AND METHODS FOR PROVIDING PERSONALIZED CALENDAR AGGREGATION

(71) Applicant: Catherine Claire Newman, Oakland, CA (US)

(72) Inventor: Catherine Claire Newman, Oakland, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/400,350

(22) Filed: May 1, 2019

(65) Prior Publication Data

US 2019/0259005 A1    Aug. 22, 2019

Related U.S. Application Data

(63) Continuation of application No. 14/938,760, filed on Nov. 11, 2015, now Pat. No. 10,318,929.

(60) Provisional application No. 62/085,500, filed on Nov. 29, 2014.

(51) Int. Cl.
G06Q 10/10         (2012.01)
(52) U.S. Cl.
CPC ............... *G06Q 10/1095* (2013.01)
(58) Field of Classification Search
None
See application file for complete search history.

(56) References Cited

U.S. PATENT DOCUMENTS

| | | | |
|---|---|---|---|
| 7,039,596 B1* | 5/2006 | Lu | G06Q 10/06311 705/7.13 |
| 9,633,114 B1* | 4/2017 | Kamangar | G06F 17/30864 |
| 10,318,929 B1* | 6/2019 | Newman | G06Q 10/1095 |
| 2008/0229225 A1* | 9/2008 | Kaye | G06F 17/30241 715/771 |
| 2009/0083367 A1* | 3/2009 | Li | G06Q 30/02 709/202 |
| 2012/0084286 A1* | 4/2012 | Hubner | G06Q 10/1093 707/737 |
| 2012/0144342 A1* | 6/2012 | Yu | G06F 3/0482 715/830 |
| 2013/0097186 A1* | 4/2013 | van Hoff | H04L 67/306 707/749 |
| 2014/0225897 A1* | 8/2014 | Sarrazin | G06Q 10/109 345/467 |
| 2015/0058324 A1* | 2/2015 | Kauwe | G06Q 50/01 707/722 |

(Continued)

*Primary Examiner* — Leland Marcus
(74) *Attorney, Agent, or Firm* — Sheppard Mullin Richter & Hampton LLP

(57) ABSTRACT

Systems, methods, and non-transitory computer-readable media can acquire an identifier associated with a calendar client. A first set of one or more events associated with a first calendar subscribed to by the calendar client can be selected based on the identifier. A second set of one or more events associated with a second calendar subscribed to by the calendar client can be selected based on the identifier. An aggregated calendar event for a particular day can be provided when at least one event in at least one of the first set or the second set is scheduled for the particular day. The aggregated calendar event can be presentable at the calendar client to represent the at least one event.

20 Claims, 10 Drawing Sheets

(56) References Cited

U.S. PATENT DOCUMENTS

2015/0095086 A1\* 4/2015 Gopinath ........... G06Q 10/1093
705/7.18
2016/0364698 A1\* 12/2016 Bouz .................. G06Q 10/1095

\* cited by examiner

500

Input the calendar feeds you'd like to have merged with any filter terms

Your Calendar Title: [                                      ]

Calendar 1: [https://calendarfeed......]
　Filter Terms: [comma separated, ignore case]
Calendar 2: [https://calendarfeed......]
　Filter Terms: [comma separated, ignore case]
Calendar 3: [https://calendarfeed......]
　Filter Terms: [comma separated, ignore case]
Calendar 4: [https://calendarfeed......]
　Filter Terms: [comma separated, ignore case]
Calendar 5: [https://calendarfeed......]
　Filter Terms: [comma separated, ignore case]
Calendar 6: [https://calendarfeed......]
　Filter Terms: [comma separated, ignore case]
Calendar 7: [https://calendarfeed......]
　Filter Terms: [comma separated, ignore case]
Calendar 8: [https://calendarfeed......]
　Filter Terms: [comma separated, ignore case]

( Generate Calendar Feed )

SYSTEMS AND METHODS FOR PROVIDING PERSONALIZED CALENDAR AGGREGATION

CROSS-REFERENCE TO RELATED APPLICATIONS

This application is a continuation of U.S. patent application Ser. No. 14/938,760, filed on Nov. 11, 2015 and entitled "SYSTEMS AND METHODS FOR PROVIDING PERSONALIZED CALENDAR AGGREGATION", which claims priority to U.S. Provisional Patent Application No. 62/085,500, filed on Nov. 29, 2014 and entitled "Digital Calendar Management Service/Assistant/Application", which are all incorporated herein by reference.

FIELD OF THE INVENTION

The present technology relates to the field of digital calendars. More particularly, the present technology relates to techniques for providing personalized calendar aggregation.

BACKGROUND

Today, people often utilize computing devices (or systems) for a wide variety of purposes. Users can use their computing devices to, for example, interact with one another, access content, share content, and create content. In some cases, users can utilize their computing devices for scheduling purposes. In one example, a user of a computing device can utilize the computing device to create a calendar (e.g., a digital or electronic calendar). In this example, the user can use the calendar via the computing device in order to keep track of events (e.g., activities, meetings, deadlines, appointments, or action items).

In some instances, users may be interested in attending particular events, which may be provided by particular organizations or entities. Under conventional approaches rooted in computer technology, it can be necessary for the users to search for, identify, and manually add each of those particular events of interest into the users' calendars. If the users forget to add each of those particular events or if the users were unaware of those particular events, then the users may miss those particular events. Moreover, in accordance with conventional approaches, users may sometimes be subscribed to mass messaging systems (e.g., mass email systems), which may attempt to inform the users about potentially interesting events. However, messages delivered by such mass messages systems are often times irrelevant or uninteresting to the users, and the quantity and the quality of the messages received can be undesirable. As such, conventional approaches can create challenges for or reduce the overall experience associated with utilizing calendars.

SUMMARY

Various embodiments of the present disclosure can include systems, methods, and non-transitory computer readable media configured to acquire an identifier associated with a calendar client. A first set of one or more events associated with a first calendar subscribed to by the calendar client can be selected based on the identifier. A second set of one or more events associated with a second calendar subscribed to by the calendar client can be selected based on the identifier. An aggregated calendar event for a particular day can be provided when at least one event in at least one of the first set or the second set is scheduled for the particular day. The aggregated calendar event can be presentable at the calendar client to represent the at least one event.

In an embodiment, additional information about the at least one event can be acquired from at least one of the first calendar or the second calendar. The additional information can include at least one of a title, a description, a time, a location, contact data, reservation data, price data, or web data. The additional information about the at least one event can be transmitted to the calendar client. The calendar client can be enabled to provide the additional information about the at least one event when an interaction with respect to the aggregated calendar event is detected.

In an embodiment, information associated with the first calendar can be received. A computer code portion can be generated based on the information associated with the first calendar. The computer code portion can be enabled to be implementable at a web resource associated with the first calendar. The computer code portion can be configured to provide, when implemented at the web resource associated with the first calendar, an interactive element for subscribing to the first calendar.

In an embodiment, it can be detected, based on the identifier, that the calendar client has subscribed to a third calendar including a third set of one or more events. It can be determined that a particular event in the third set is scheduled for the particular day. The aggregated calendar event for the particular day can be caused to represent the particular event in the third set and the at least one event in at least one of the first set or the second set.

In an embodiment, information associated with at least one of the calendar client, the first calendar, the second calendar, or the at least one event can be acquired. An analytics report can be generated based on the information. The analytics report can be provided to at least one of a first entity associated with the first calendar or a second entity associated with the second calendar.

In an embodiment, the analytics report can indicate at least one of: 1) a quantity of unique users who are subscribed to the first calendar, 2) a quantity of new users who subscribed to the first calendar during a specified time period, 3) a quantity of users who unsubscribed from the first calendar during the specified time period, 4) a net quantity indicating the quantity of users who unsubscribed subtracted from the quantity of new users, 5) a quantity of links in the at least one event that have received user engagement, 6) a number of times the at least one event was added to user calendars, a number of times the at least one event was shared, or 7) an identifier associated with at least a third calendar subscribed to by the calendar client.

In an embodiment, the aggregated calendar event can be presentable without appearing to be in conflict with another calendar event, presented at the calendar client, that is scheduled for the particular day.

In an embodiment, the at least one event can be included in the aggregated calendar event without event approval or event acceptance from a user of the calendar client.

In an embodiment, the at least one event can include a first event and a second event. The first event can be included in the first set associated with the first calendar. The second event can be included in the second set associated with the second calendar.

In an embodiment, one or more options can be provided. The one or more options can be associated with at least one of: 1) adding an instance of the at least one event to an existing calendar presented via the calendar client, 2) removing the instance of the at least one event from the existing calendar presented via the calendar client, 3) making a reservation for the at least one event, 4) obtaining a ticket to the at least one event, 5) sharing the at least one event, or 6) accessing a link relating to the at least one event.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 5 illustrates an example interface associated with providing personalized calendar aggregation, according to an embodiment of the present disclosure.

FIG. 6B illustrates an example interface associated with providing personalized calendar aggregation, according to an embodiment of the present disclosure.

Figure 1:
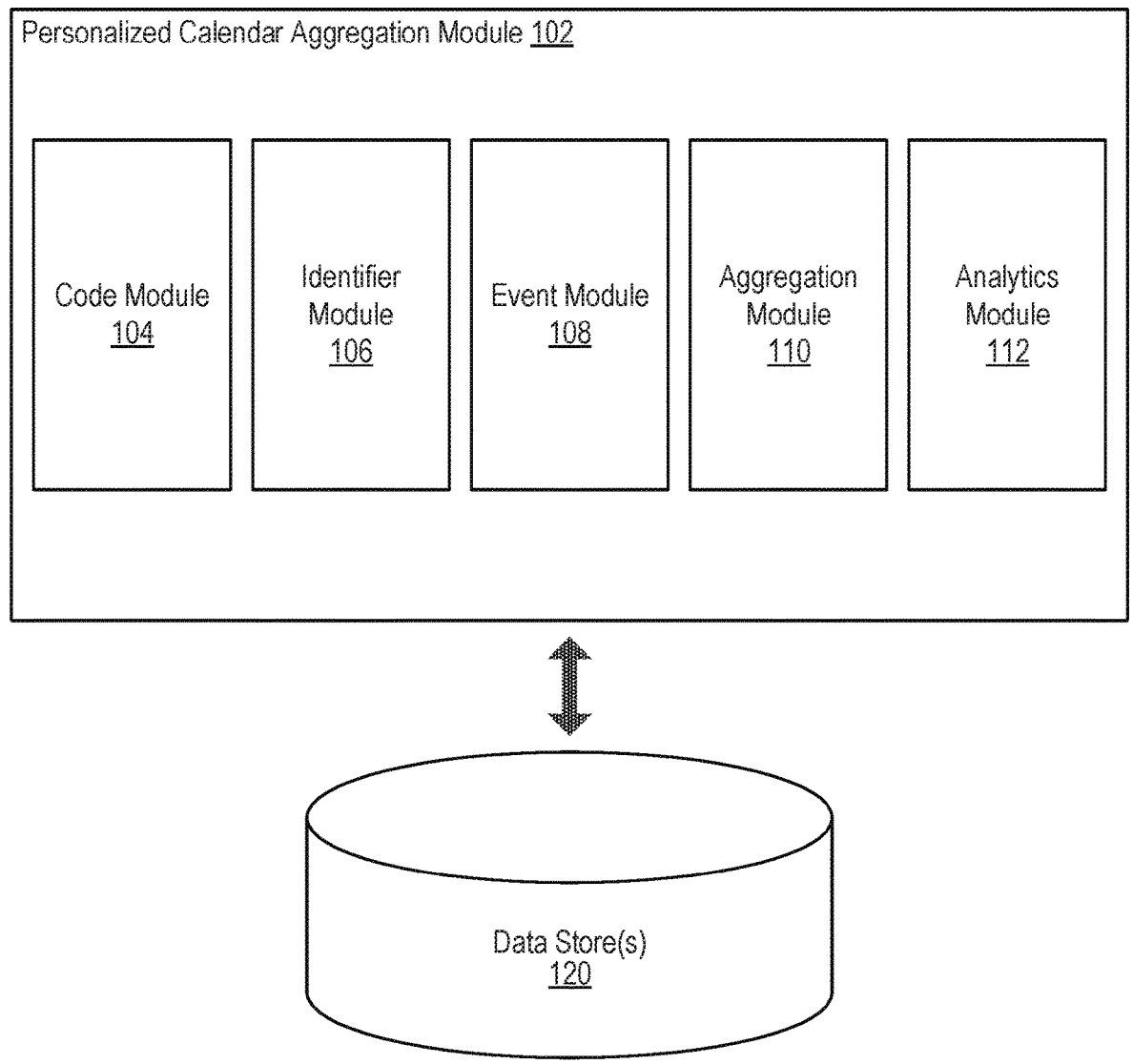
FIG. 1 illustrates an example system including an example personalized calendar aggregation module configured to facilitate providing personalized calendar aggregation, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Providing Personalized Calendar Aggregation

People use computing systems (or devices) for various purposes. Users can utilize their computing systems to establish connections, engage in communications, interact with one another, and/or interact with various types of content. In some cases, computing devices can be utilized by users to generate, edit, manipulate, or otherwise interact with calendars. For instance, a user of a computing device can utilize a calendar client (or application, app, software, program, web service, etc.) implemented at or accessible via the computing device. The user can use the calendar client to create and/or edit a calendar, such as by adding, modifying, or removing events (e.g., activities, meetings, deadlines, appointments, or other items, etc.) on the calendar.

Conventional approaches rooted in computer technology for utilizing calendars can be inefficient or inconvenient. In one example, a user may have limited free or available time. When the user does happen to be free or available, the user may desire to obtain information about an event hosted by an entity, such as an organization, club, company, etc. In this example, the user can access a web resource, such as a website, of the entity in attempt to search for and view upcoming events offered by the entity. However, the user may overlook, may be unaware of, or may fail to identify any events of (potential) interest. Further, in accordance with conventional approaches, many entities that host events do not provide users with access to (e.g., with an option to subscribe to or download) digital files, data streams/feeds, instances, or copies of their calendars which provide information about their events. As such, under conventional approaches, if the user does identify events of interest to him or her via the entity's website (e.g., the entity's website calendar, schedule, or event listing, etc.), the user may have to add each individual event of interest onto his or her own calendar via the calendar client, which can require significant effort and time. Moreover, in this example, when the user adds an event onto his or her calendar in accordance with conventional approaches, the user may feel pressure or have a sense of obligation to attend the event. If the user's plans change, the user may, in some cases, experience frustration, disappointment, guilt, or other negativity due to being unable to attend or partake in the event.

In another example, entities that host or offer events may desire to provide information about their events to potential audience members or attendees. Under conventional approaches, such entities often times transmit mass messages to a multitude of users. However, many of these users find such mass messages to be unwanted or annoying. Such users may not view or read the messages. Accordingly, such conventional approaches to providing event information can be ineffective or inefficient.

In a further example, when a user adds an event hosted by an entity onto his or her calendar, the user's calendar may appear to be cluttered or disorganized due to the presence of too many events. In some cases, the user may utilize multiple calendars (e.g., multiple instances of different calendars), such as a personal calendar, a group calendar, a work calendar, a superior's calendar, or a subordinate's calendar, etc. When the user adds the hosted event, the hosted event may be distracting and/or conflicting with respect to other more important events, such as personal or work calendars events.

Due to these or other concerns, conventional approaches can be disadvantageous or problematic. Therefore, an improved approach can be beneficial for addressing or alleviating various drawbacks associated with conventional approaches. Based on computer technology, the disclosed technology can provide personalized calendar aggregation. In some instances, a user of a calendar client can search for and identify potentially interesting events hosted by various entities, such as by browsing through the entities' websites. The disclosed technology can enable the user to subscribe to (or cause his or her calendar client to subscribe to) such interesting events identified by the user, thereby making such events personalized for the user. Moreover, the user can recognize or understand that such events hosted by the various entities may not be as important as some other events, such as certain events on the user's personal calendar or work calendar. Accordingly, the user can recognize or understand that such events should not create feelings of pressure, obligation, or guilt, etc. Furthermore, the disclosed technology can aggregate these events (if any on a particular day) into a single aggregated calendar event when they are scheduled for the same particular day. As such, the aggregated calendar event can be presented via the calendar client to appear smaller, less distracting, and/or less obtrusive, while still providing the user with access to information about the events. In some cases, the aggregated calendar event can also be presented to emphasize or make more prominent one or more events. Many variations are possible.

Various embodiments of the present disclosure can acquire an identifier associated with a calendar client, such as a calendar application utilized by a user to access his or her calendar. A first set of one or more events associated with a first calendar subscribed to by the calendar client can be selected based on the identifier. For instance, the first calendar can be associated with a first entity who hosts or presents the first set of one or more events, which have been deemed or considered by the user as being (potentially) interesting. The user can subscribe to, or can cause the calendar client to be subscribed to, the first calendar. A second set of one or more events associated with a second calendar subscribed to by the calendar client (or subscribed to by the user of the calendar client) can be selected based on the identifier. The second calendar can, for example, be associated with a second entity who hosts or organizes the second set of one or more events, which have been deemed or considered by the user as being interesting. An aggregated calendar event for a particular day can be provided when at least one event in at least one of the first set or the second set is scheduled for the particular day. The aggregated calendar event can be presentable at the calendar client to represent the at least one event. It is contemplated that there can be many variations and/or other possibilities associated with the disclosed technology.

FIG. 1 illustrates an example system 100 including an example personalized calendar aggregation module 102 configured to facilitate providing personalized calendar aggregation, according to an embodiment of the present disclosure. As shown in the example of FIG. 1, the personalized calendar aggregation module 102 can include a code module 104, an identifier module 106, an event module 108, an aggregation module 110, and an analytics module 112. In some cases, the personalized calendar aggregation module 102 can operate with, can be implemented with, and/or can be included with a personalized calendar aggregation service (e.g., online service). In some instances, the example system 100 can include at least one data store 120. The components (e.g., modules, elements, data stores, etc.) can work together or operate in conjunction to accomplish a wide variety of tasks and/or to perform various operations. The components shown in this figure and all figures herein are exemplary only, and other implementations may include additional, fewer, integrated, or different components. Some components may not be shown so as not to obscure relevant details.

In some embodiments, the personalized calendar aggregation module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the personalized calendar aggregation module 102 can be implemented, in part or in whole, as software running on one or more computing devices or systems, such as on a user or client computing device. For example, the personalized calendar aggregation module 102 or at least a portion thereof can be implemented as or within an application (e.g., app), a program, an applet, or an operating system, etc., running on a user computing device or a client computing system, such as the computer system 700 of FIG. 7. In another example, the personalized calendar aggregation module 102 or at least a portion thereof can be implemented using one or more computing devices or systems that include one or more servers, such as network servers or cloud servers. In some instances, the personalized calendar aggregation module 102 can, in part or in whole, be implemented within or configured to operate with the one or more servers 806 of FIG. 8. It should be appreciated that there can be many variations or other possibilities.

Additionally, in some embodiments, the personalized calendar aggregation module 102 can be configured to communicate and/or operate with the at least one data store 120, as shown in the example system 100. The at least one data store 120 can be configured to store and maintain various types of data. In some implementations, the at least one data store 120 can store information associated with users, such as user identifiers, user information, profile information, user locations, user specified settings, content produced by users, and various other types of user data. In some embodiments, the at least one data store 120 can store information that is utilized by the personalized calendar aggregation module 102, such as information associated with calendars, events, entities, and/or calendar clients (or their users). Again, it is contemplated that there can be many variations or other possibilities associated with the disclosed technology.

In some instances, entities can be associated with, can own, can manage, and/or can maintain calendars. For example, entities can own and maintain their respective calendars in the cloud or via one or more networks. Links to the calendars that are operable with the disclosed technology can be generated. In some embodiments, the disclosed technology can enable the creation and/or local hosting of calendars. In some implementations, the disclosed technology can also enable the calendars to be searchable.

In some cases, there can be (at least) a first entity and a second entity. The first entity can be associated with a first calendar and the second entity can be associated with a second calendar. Each of the first entity and the second entity can correspond to an organization, a club, a group, a company, a business, or a representative/admin, etc. In one example, the first entity can correspond to a museum and the second entity can correspond to a dance company. The first calendar can correspond to the museum's calendar and can include a first set of one or more events at the museum. Similarly, the second calendar can correspond to the dance company's calendar and can include a second set of one or more events hosted or showcased by the dance company. It should be understood that all examples herein are provided for illustrative purposes and that many variations are possible.

The disclosed technology can enable the first entity to provide functionality that allows users to subscribe to the first calendar, such as via a web resource (e.g., website, webpage, etc.) of the first entity. The disclosed technology can, for instance, cause a "subscribe" button to be generated, at the web resource of the first entity, based on information associated with the first calendar. In some implementations, the code module 104 can be configured to facilitate receiving information associated with the first calendar. For example, the first entity can provide or input the information associated with the first calendar, which can be received by the code module 104. In some cases, the information associated with the first calendar can include (but is not limited to) a calendar address, a calendar title, an author name, a pin or key for the first calendar, a calendar filter, a calendar keyword, and/or contact data for the first entity, etc. The first calendar can then be provided to or become accessible by the personalized calendar aggregation module 102, such as via the calendar address.

The code module 104 can generate a computer code portion, such as a snippet of JavaScript code, based on the information associated with the first calendar. Access to the computer code portion can be provided to the first entity (and/or to a web resource of the first entity). The code module 104 can also enable the computer code portion to be implementable at a web resource associated with the first calendar, such as a website of the first entity. The computer code portion can be configured to provide, when implemented at the web resource associated with the first calendar, an interactive element (e.g., "subscribe" button) for subscribing to the first calendar. In one example, the first entity can (copy and) paste the computer code portion into code for developing or rendering the first entity's website, such that the interactive element is embedded within or displayed on the website. When a user clicks on, taps on, or otherwise interacts with the interactive element, the user (or a calendar client of the user) can be subscribed to the first calendar, which can include the first set of one or more events. The information associated with the first calendar can be stored, such as via a table, at the at least one data store 120. Similarly, the above can be repeated for the second entity and the second calendar, as well as any suitable number of additional entities and calendars.

Moreover, in some embodiments, the identifier module 106 can be configured to provide, assign, and/or utilize identification information for distinguishing between different calendar clients (or users thereof) and between different calendars. For example, subsequent to subscribing to the first calendar by the calendar client (or its user), an identifier for identifying the calendar client (or its user) can be generated by the identifier module 106. The identifier can, for instance, be included in a cookie or other data portion, which can be stored at the calendar client. Also, the identifier module 106 can, in some cases, generate an identifier for the first calendar. The identifier module 106 and the at least one data store 120 can work together or operate in conjunction to utilize the identifiers for storing and maintaining a record of which calendar clients (or users thereof) have subscribed to which entities' calendars. It is contemplated that many variations are possible.

In some implementations, the calendar client can ping or initiate communications with the personalized calendar aggregation module 102 over time, such as periodically (e.g., once per minute, once per hour, once per day, once per week, once per month, etc.). Additionally or alternatively, in some embodiments, the personalized calendar aggregation module 102 can ping or initiate communications with the calendar clients stored in the at least one data store 120. Via the ping or the communications, the identifier module 106 can be further configured to facilitate acquiring (e.g., receiving, retrieving, fetching, etc.) an identifier associated with a calendar client. The identifier can, for instance, correspond to a unique string, key, or value that differentiates between the calendar client (or its user) and other calendar clients (or their users).

Moreover, in some embodiments, the event module 108 can facilitate selecting, based on the identifier associated with the calendar client, a first set of one or more events associated with a first calendar subscribed to by the calendar client. In some cases, utilizing the identifier associated with the calendar client, the event module 108 can work or operate with the at least one data store 120 to select (e.g., identify, locate, determine, etc.) the first set of one or more events associated with the first calendar, which has been subscribed to by the calendar client. For instance, the event module 108 can access a table stored in the at least one data store 120 to determine that there is a record of the first calendar, identified via a particular calendar identification, being subscribed to by the calendar client (or by its user), identified via the acquired identifier. Likewise, in some embodiments, the event module 108 can facilitate selecting, based on the identifier, a second set of one or more events associated with a second calendar subscribed to by the calendar client. For example, the table stored in the at least one data store 120 can include another record of the second calendar, identified via another particular calendar identification, being subscribed to by the calendar client (or by its user), identified via the acquired identifier. It should be understood that many variations are possible.

Additionally, the aggregation module 110 can be configured to facilitate acquiring and aggregating multiple calendars, such as the first calendar and the second calendar. In an example, the first calendar and the second calendar can each be acquired, retrieved, or received via a respective feed (e.g., a respective ICS feed, etc.) from a respective entity web resource. Moreover, in some implementations, the aggregation module 110 can provide an aggregated calendar event for a particular day when at least one event in at least one of the first set or the second set is scheduled for the particular day. For instance, the aggregated calendar event can be provided to the calendar client via an ICS feed. The aggregated calendar event can be presentable at the calendar client to represent the at least one event. Accordingly, upon subscribing to the first calendar and the second calendar, events included in those calendars can be accessible via the calendar client without requiring the user of the calendar client to manually search for, identify, and add each of those events. In some cases, the at least one event can be included in the aggregated calendar event without event approval or event acceptance from the user of the calendar client.

In some instances, the at least one event can include a first event and a second event. The first event can be included in the first set associated with the first calendar. The second event can be included in the second set associated with the second calendar. In one example, there can be events from both the first set and the second set that are scheduled for a given day. On that given day, the aggregation module 110 can provide or generate an aggregated calendar event which represents the events from both the first and second sets. In another example, if there is only one event from the first set scheduled for a certain day, then the aggregation module 110 can provide an aggregated calendar event on that certain day to represent the only one event from the first set. Similarly, if there is only one event from the second set scheduled for a certain day, then the aggregation module 110 can provide an aggregated calendar event on that certain day to represent the only one event from the second set. In a further example, on days where no events, either from the first set or the second set, are scheduled, then there can be no aggregated calendar events for those days.

Further, in one instance, the identifier module 106 can detect, based on the identifier associated with the calendar client, that the calendar client has subscribed to a third calendar including a third set of one or more events. The event module 108 can determine that a particular event in the third set is scheduled for the particular day (for which the at least one event in at least one of the first set or the second set is also scheduled). In this instance, the aggregation module 110 can cause the aggregated calendar event for the particular day to represent the particular event in the third set and the at least one event in at least one of the first set or the second set. Again, it should be appreciated that there can be many variations or other possibilities associated with the disclosed technology. For instance, in some cases, even if the first calendar, the second calendar, or the third calendar are empty, blank, or do not include any events, these calendars can still be subscribed to. Also, in some instances, any suitable number of calendars (e.g., a fourth calendar, a fifth calendar, etc.) can be utilized with the disclosed technology.

Moreover, in some cases, the event module 108 can acquire, from at least one of the first calendar or the second calendar (or the third calendar, etc.), additional information about the at least one event (or about the particular event in the third calendar, etc.). The additional information can include, for example, at least one of a title, a description, a time, a location, contact data, reservation data, price data, or web data, etc. The event module 108 can transmit, to the calendar client, the additional information about the at least one event. Subsequently, the calendar client can be enabled to provide the additional information about the at least one event when an interaction with respect to the aggregated calendar event is detected. For instance, when the user of the calendar client clicks on, presses on, taps on, or mouse-hovers over, etc., the aggregated calendar event, the additional information can be provided or presented.

Furthermore, in some instances, the analytics module 112 can be configured to facilitate acquiring information associated with at least one of the calendar client, the first calendar, the second calendar, or the at least one event (or the third calendar, the particular event in the third calendar, etc.). The analytics module 112 can generate an analytics report based on the information. The analytics report can be provided to at least one of a first entity associated with the first calendar or a second entity associated with the second calendar (or a third entity associated with the third calendar, etc.).

The analytics report can, for example, indicate a quantity of unique users who are subscribed to the first calendar (or the second calendar, the third calendar, etc.). The analytics report can also indicate a quantity of new users who subscribed to the first calendar (or another calendar) during a specified time period, a quantity of users who unsubscribed from the first calendar during the specified time period, and/or a net quantity indicating the quantity of users who unsubscribed subtracted from the quantity of new users. In some cases, the analytics report can further indicate a quantity of links in the at least one event (or another event represented in an aggregated calendar event) that have received user engagement, a number of times the at least one event was added to user calendars, or a number of times the at least one event was shared. Moreover, the analytics report can, in some instances, indicate an identifier associated with at least one other calendar subscribed to by the calendar client. For example, the analytics module 112 can observe that many calendar clients who subscribe to the first calendar are also subscribed to the third calendar. The analytics module 112 can then include this observation in the analytics report. In some cases, the analytics report can possess commercial or financial value. For instance, entities can purchase various analytics reports. Again, there can be many variations or other possibilities associated with the disclosed technology.

Figure 2:
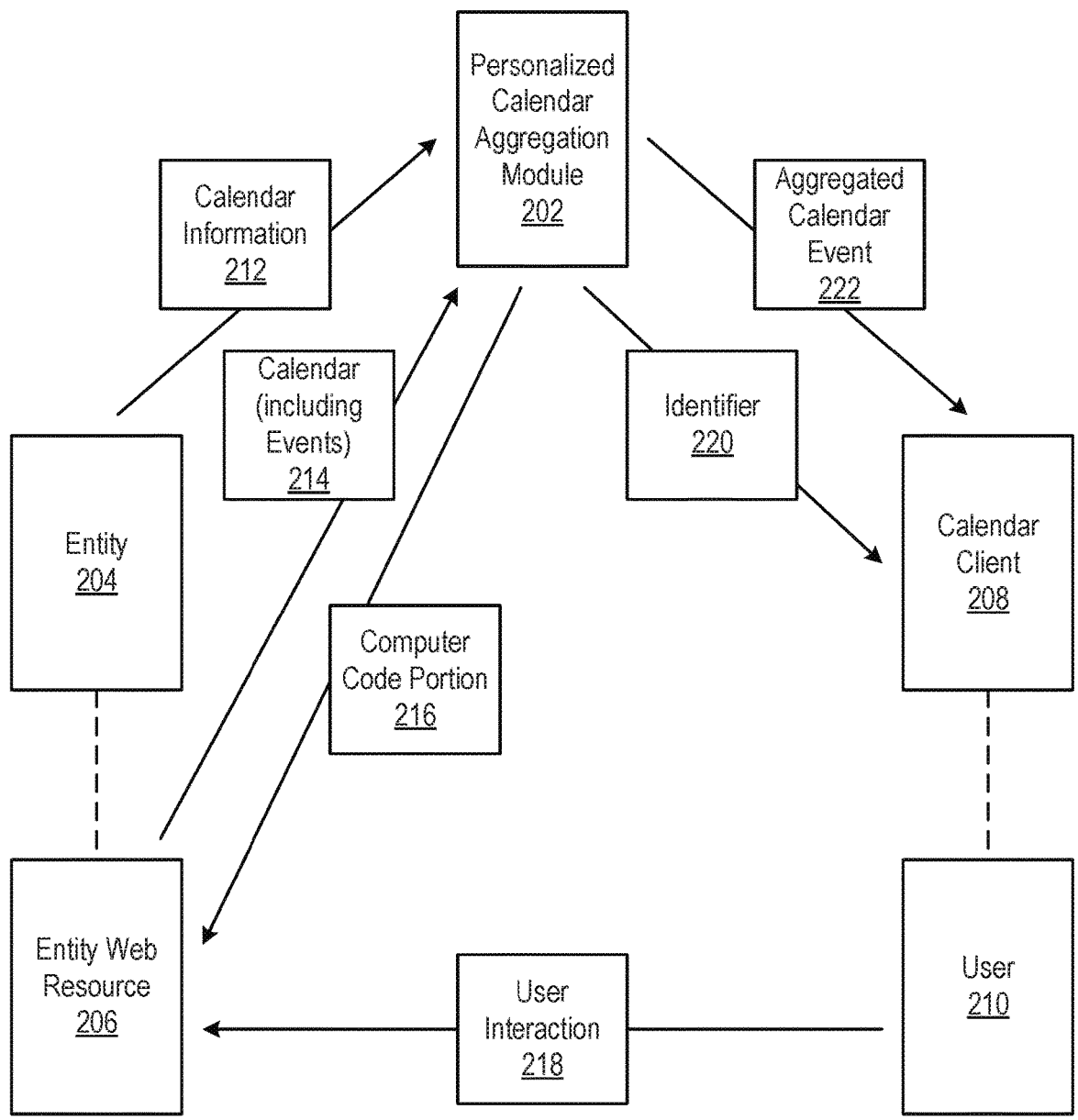
FIG. 2 illustrates an example scenario associated with providing personalized calendar aggregation, according to an embodiment of the present disclosure.

FIG. 2 illustrates an example scenario 200 associated with providing personalized calendar aggregation, according to an embodiment of the present disclosure. The example scenario 200 illustrates an example personalized calendar aggregation module 202. In some embodiments, the example personalized calendar aggregation module 202 can be implemented as the personalized calendar aggregation module 102 of FIG. 1. Moreover, as shown in the example scenario 200 of FIG. 2, there can be an example entity 204, an example web resource 206 associated with the entity 204, an example calendar client 208, and an example user 210 of the calendar client 208.

In some embodiments, the personalized calendar aggregation module 202 can acquire information about a calendar (i.e., calendar information 212) provided by the entity 204. For example, the personalized calendar aggregation module 202 can cause a web form to be presented to the entity 204. The entity 204 can input the calendar information 212 via the web form. In some instances, the calendar information 212 can include a calendar address, a calendar title, an author name, a pin number, a calendar filter, a calendar keyword, contact data, and/or various other types of information or metadata. In some cases, the calendar (or an instance thereof) including various events 214 can be provided to or can become accessible to the personalized calendar aggregation module 202, such as via a calendar stream or feed. For instance, the calendar address (and/or other data) included in the calendar information 212 can provide the personalized calendar aggregation module 202 with access to a stream, a feed, and/or a download of (an instance of) the calendar including its events 214. Moreover, based on the calendar information 212, the personalized calendar aggregation module 202 can generate a computer code portion 216 (e.g., a snippet of JavaScript code), which can be provided to the web resource 206. The computer code portion 216 can be implemented at the web resource 206. This can enable an interactive element (e.g., a "subscribe" button) to be presented at the web resource 206.

In some instances, the user 210 of the calendar client 208 can click on, tap on, or otherwise interact 218 with the interactive element at the web resource 206. The user interaction 218 can result in the calendar client 208 being subscribed to the calendar 214 associated with the entity 204. The personalized calendar aggregation module 202 can also generate an identifier 220 for the calendar client 208 (or the user 210). For example, the personalized calendar aggregation module 202 can generate a cookie that includes the identifier 220 for the calendar client 208. Moreover, the personalized calendar aggregation module 202 can also create a record of the calendar 214 being subscribed to by the calendar client 208 associated with the identifier 220. In some cases, based on the identity of the calendar client 208 as determined from the identifier 220, the personalized calendar aggregation module 202 can determine, identify, or select all other calendars to which the calendar client 208 (or the user 210) has subscribed. The personalized calendar aggregation module 202 can aggregate or combine events from all subscribed calendars to generate a respective aggregated calendar event 222 for each day on which at least one event from any of the subscribed calendars is scheduled. As discussed above, it should be understood that all examples herein are provided for illustrative purposes and that there can be many variations associated with the disclosed technology.

Figure 3A:
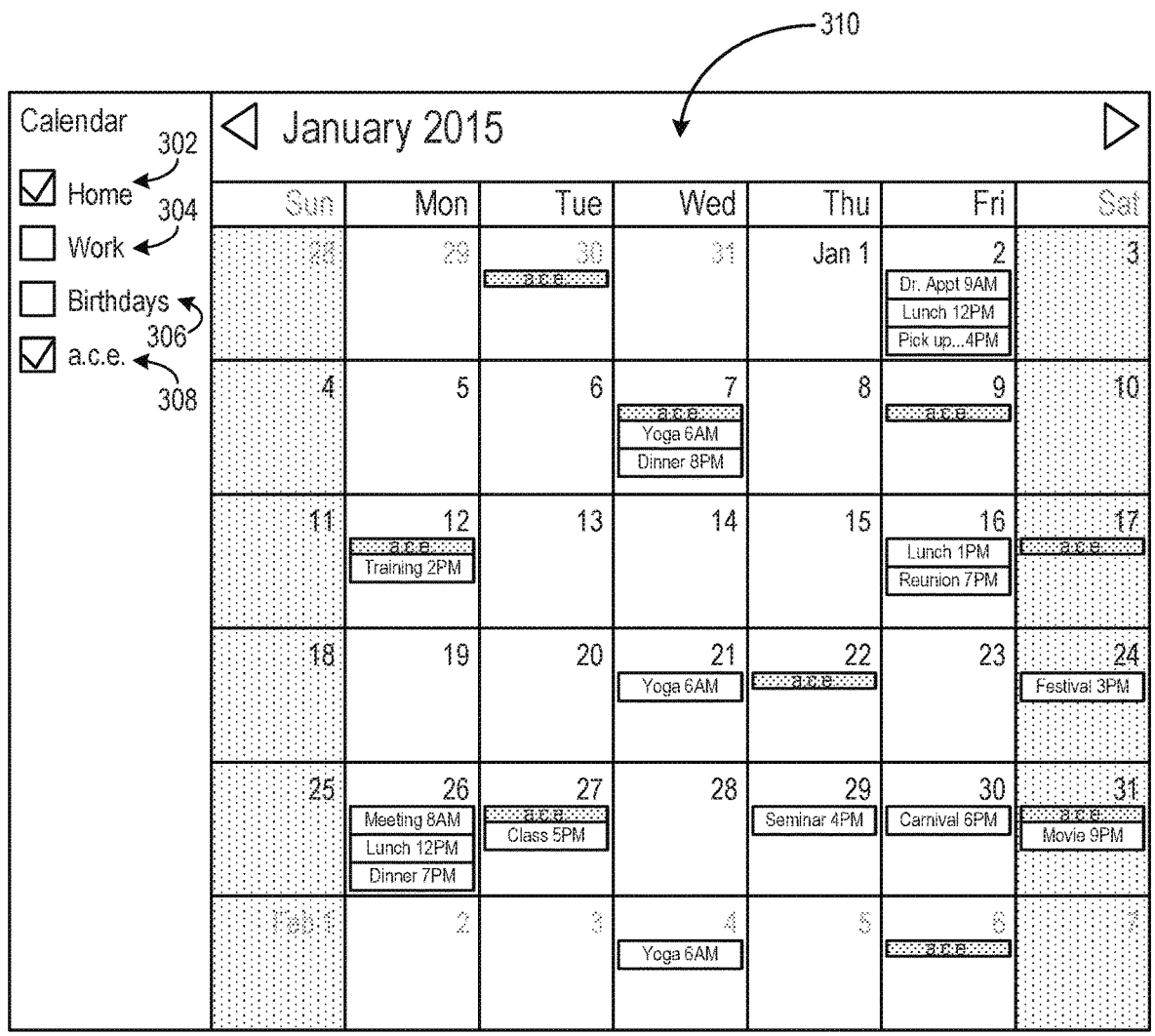
FIG. 3A illustrates an example interface associated with providing personalized calendar aggregation, according to an embodiment of the present disclosure.

FIG. 3A illustrates an example interface 300 associated with providing personalized calendar aggregation, according to an embodiment of the present disclosure. In FIG. 3A, the example interface 300 can correspond to a user interface of a calendar client utilized by a user. In some embodiments, the interface 300 can present various calendars of the user. As shown, the interface 300 can present a "Home" calendar 302 of the user, a "Work" calendar 304 of the user, a "Birthdays" calendar 306 of the user, and an aggregated calendar event ("a.c.e.") calendar 308. The aggregated calendar event ("a.c.e.") calendar 308 can include a set of "a.c.e." events. The "a.c.e." events can correspond to aggregated calendar events generated and/or provided based on personalized calendar aggregation, which can be facilitated by the personalized calendar aggregation module 102 of FIG. 1.

Continuing with the example of FIG. 3A, the user has elected to display only the "Home" calendar 302 and the "a.c.e." calendar 308. Accordingly, an interface portion 310 of the calendar client interface 300 shows both events from the "Home" calendar 302 as well as "a.c.e." events. As discussed previously, in some implementations, aggregated calendar events (e.g., "a.c.e." events) can be presented to appear smaller, less distracting, and/or less obtrusive. Moreover, in some embodiments, an aggregated calendar event can be presentable without appearing to be in conflict with another calendar event, presented at the calendar client, that is scheduled for the same particular day as the aggregated calendar event. For instance, aggregated calendar events can be set to be "transparent", even if other calendar events are "opaque". In another instance, aggregated calendar events can be set to be optional, even if other calendar events are required. Accordingly, aggregated calendar events can be prevented from appearing to be in scheduling conflicts with other calendar events, even if they are scheduled to share the same time periods.

Furthermore, in some cases, the "a.c.e." name can be replaced with a different name. For example, each aggregated calendar event can be named or labeled with proprietary names, such as ".Y.", "Y.Y", "FYI Cal", etc. It should be understood that many variations are possible.

Figure 3B:
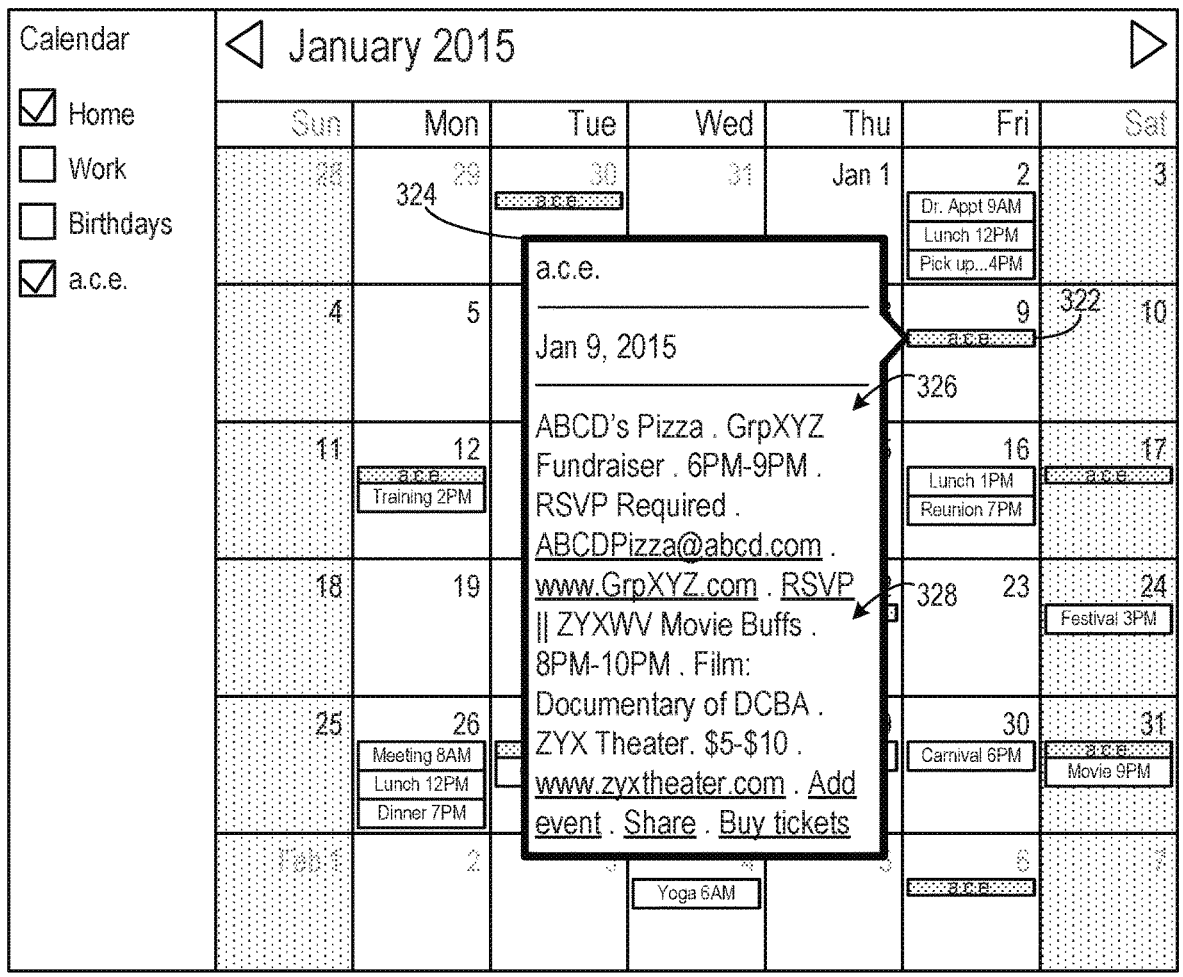
FIG. 3B illustrates an example interface associated with providing personalized calendar aggregation, according to an embodiment of the present disclosure.

FIG. 3B illustrates an example interface 320 associated with providing personalized calendar aggregation, according to an embodiment of the present disclosure. The example interface 320 can correspond to a user interface for a calendar client. In the example of FIG. 3B, a user of the calendar client has clicked on, tapped on, mouse-hovered over, or otherwise interacted with an aggregated calendar event 322. As a result, an interface portion 324 can be presented via the calendar client to provide additional information about the aggregated calendar event 322.

As shown, the interface portion 324 can provide additional information about a first event 326 included in a subscribed first calendar associated with a first entity (e.g., GrpXYZ) as well as additional information about a second event 328 included in a subscribed second calendar associated with a second entity (e.g., ZYXWV Movie Buffs). In some implementations, the order in which the first and second events are presented can be ranked, such as based on relevancy with respect to the user. In some embodiments, the order in which the first and second events are presented can be determined by financial factors (e.g., an entity who pays more can receive a higher presentation order). Many variations are possible.

Additionally, in some instances, one or more options can be provided. The one or more options can be associated with at least one of: 1) adding an instance of at least one event to an existing calendar presented via the calendar client, 2) removing the instance of the at least one event from the existing calendar presented via the calendar client, 3) making a reservation for the at least one event, 4) obtaining a ticket to the at least one event, 5) sharing the at least one event, or 6) accessing a link relating to the at least one event. In the example of FIG. 3B, a link (e.g., "www.GrpXYZ-.com") relating to the first event can be accessed. A reservation (e.g., "RSVP") for the first event can also be made. Moreover, another link (e.g., "www.zyxtheater.com") relating to the second event can be accessed. The second event can also be added (e.g., "Add event") to an existing calendar of the user. The second event can also be shared (e.g., "Share") by the user. Further, the user can obtain one or more tickets to the second event (e.g., "Buy tickets"). Again, it is contemplated that many variations are possible.

Figure 4:
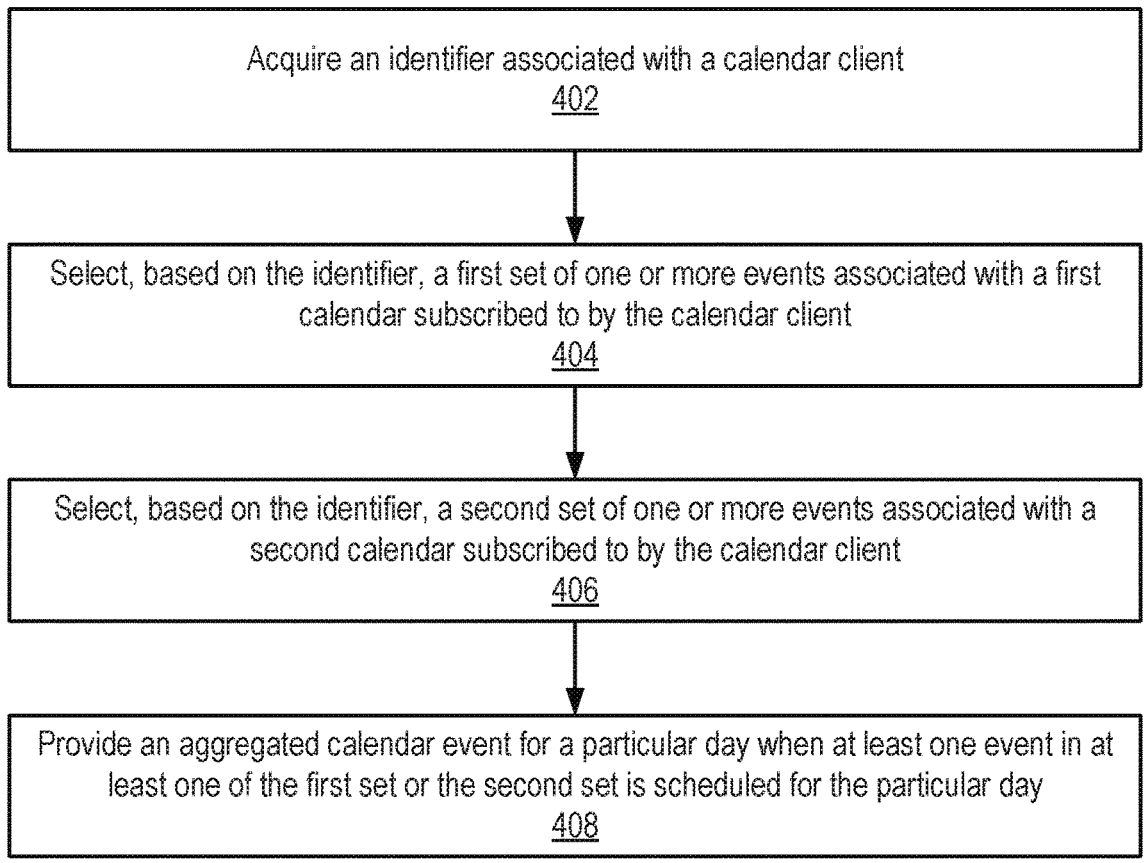
FIG. 4 illustrates an example method associated with providing personalized calendar aggregation, and aggregation according to an embodiment of the present disclosure.

FIG. 4 illustrates an example method 400 associated with providing personalized calendar aggregation, according to an embodiment of the present disclosure. It should be appreciated that there can be additional, fewer, or alternative steps performed in similar or alternative orders, or in parallel, within the scope of the various embodiments unless otherwise stated.

At block 402, the example method 400 can acquire an identifier associated with a calendar client. At block 404, the example method 400 can select, based on the identifier, a first set of one or more events associated with a first calendar subscribed to by the calendar client. At block 406, the example method 400 can select, based on the identifier, a second set of one or more events associated with a second calendar subscribed to by the calendar client. At block 408, the example method 400 can provide an aggregated calendar event for a particular day when at least one event in at least one of the first set or the second set is scheduled for the particular day. The aggregated calendar event can be presentable at the calendar client to represent the at least one event.

It is contemplated that there can be many other uses, applications, features, possibilities, and/or variations associated with the various embodiments of the present disclosure. In some embodiments, the identifier associated with the calendar client need not be acquired. A first set of one or more events associated with a first calendar can be local to (e.g., already existing and stored at) and accessible by the calendar client. The first calendar can be selected, such as based on a first user command (e.g., a search/input using an address/URL, a name, a title, and/or a keyword, etc., associated with the first calendar). A second set of one or more events associated with a second calendar can be local to and accessible by the calendar client. The second calendar can be selected, such as based on a second user command (e.g., a search/input using an address/URL, a name, a title, and/or a keyword, etc., associated with the second calendar). The disclosed technology can provide an example interface (e.g., user interface, webpage, website, web resource, etc.) 500 for selecting the first calendar and the second calendar (or additional calendars), as shown in FIG. 5. A new calendar that merges (at least) the first calendar and the second calendar can be generated. In the new calendar, an aggregated calendar event for a particular day can be provided when at least one event in at least one of the first set or the second set is scheduled for the particular day. The aggregated calendar event can be presentable at the calendar client to represent the at least one event.

Figure 6A:
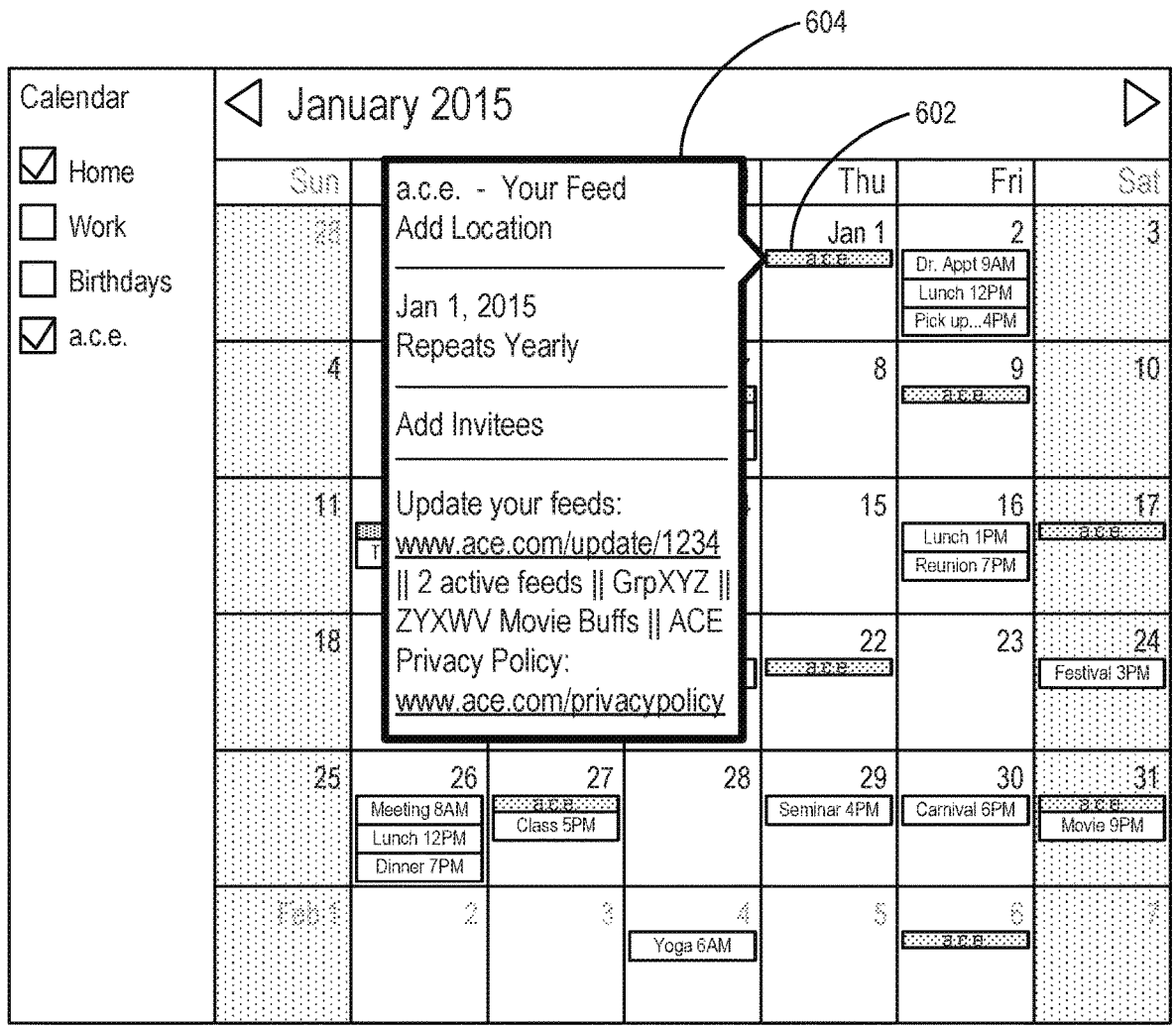
FIG. 6A illustrates an example interface associated with providing personalized calendar aggregation, according to an embodiment of the present disclosure.

In some embodiments, the disclosed technology can provide an informational calendar event 602, as shown in FIG. 6A. In some cases, the informational calendar event 602 can provide summarized calendar information for the user. The informational calendar event 602 can, for example, provide various types of content 604, such as information about a user's calendar(s) (e.g., calendar feed(s)/subscription(s)), descriptions, options, preferences, links for updating the user's calendar(s), a link to a privacy policy, and/or other content. In one instance, the informational calendar event 602 can be presented periodically on the first day of every year, as shown in the example of FIG. 6A. It should be appreciated that many variations are possible. For instance, the informational calendar event 602 can be presented at any suitable time/day.

Figure 6B:
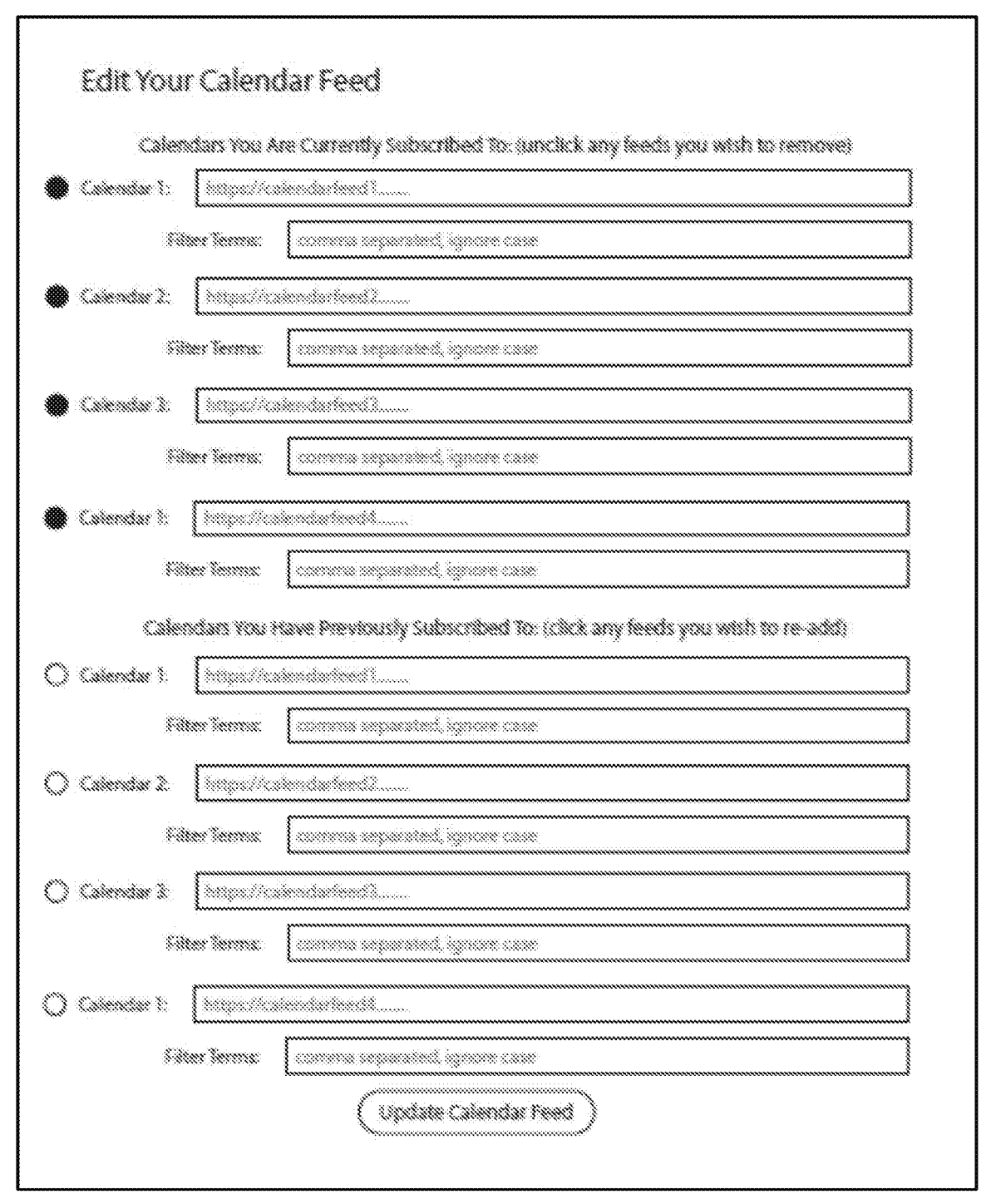

In some embodiments, the disclosed technology can also provide an example interface, as shown in FIG. 6B, when the user attempts to update his or her feed(s) by clicking on, tapping on, interacting with, or otherwise accessing the link "www.ace.com/update/1234" included in the content 604 provided by the informational calendar event 602 of FIG. 6A. In some cases, the example interface of FIG. 6B can enable the user to edit or update his or her calendar feed(s). For example, the user can remove one or more calendar feeds to which the user is currently subscribed. In another example, the user can re-add one or more calendar feeds to which the user was previously subscribed. Again, many variations associated with the disclosed technology are possible.

In some implementations, when an entity or its web resource updates or modifies at least one event in the entity's calendar, the update or modification can be transmitted to the calendar client and can become accessible via the aggregated calendar event. Again, many variations associated with the disclosed technology are possible. For example, users can, in some cases, choose whether or not to opt-in to utilize the disclosed technology. In another example, various embodiments of the present disclosure can learn, improve, and/or be refined over time.

Hardware Implementation

Figure 7:
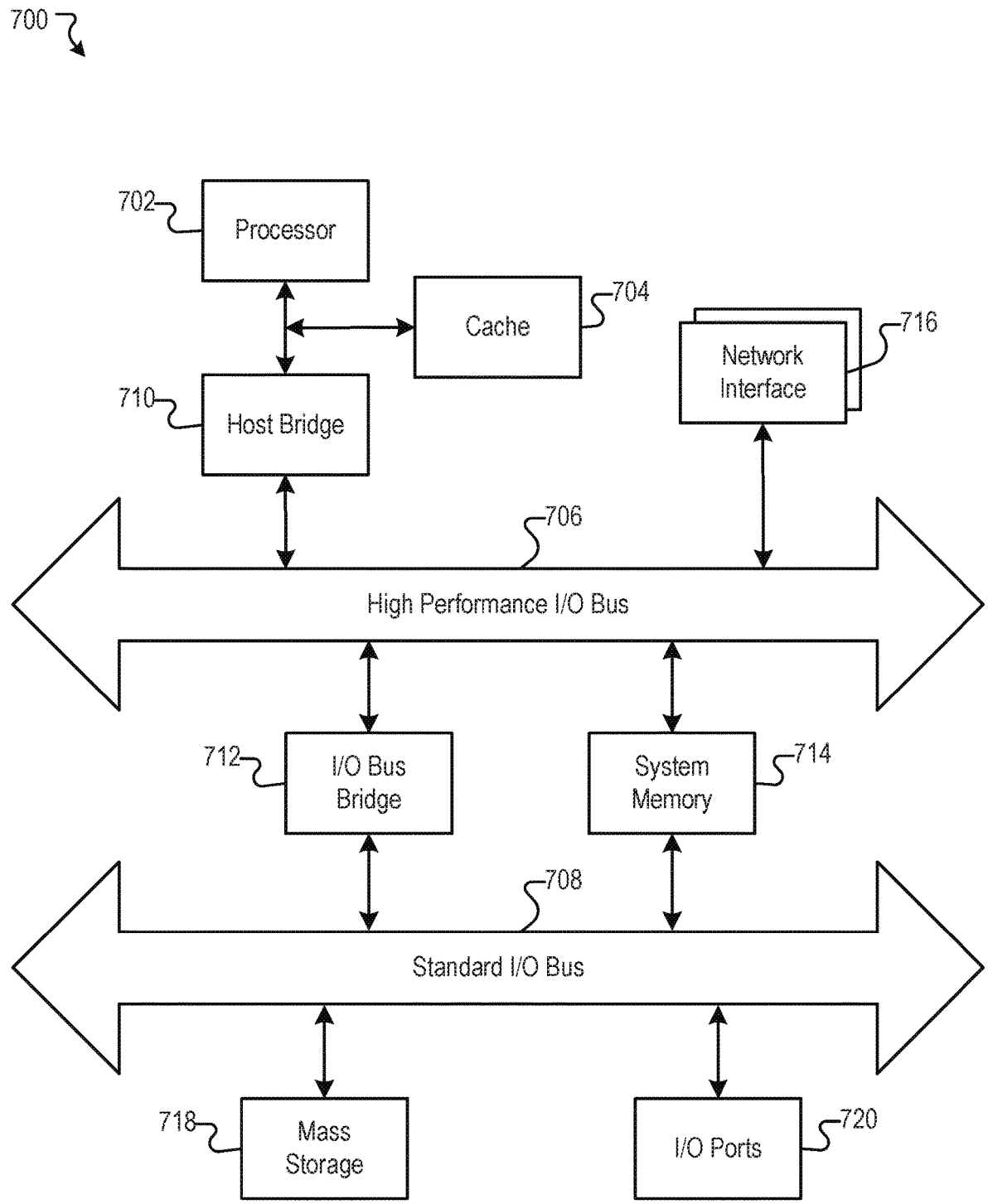
FIG. 7 illustrates an example of a computing device or system that can be used to implement one or more of the embodiments described herein, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be a component of the networking system described herein. In an embodiment of the present disclosure, the computer system 700 may be one server among many that constitutes all or part of a networking system.

The computer system 700 can include a processor 702, a cache 704, and one or more executable modules and drivers, stored on a computer-readable medium, directed to the processes and features described herein. Additionally, the computer system 700 may include a high performance input/output (I/O) bus 706 or a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Furthermore, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

Figure 8:
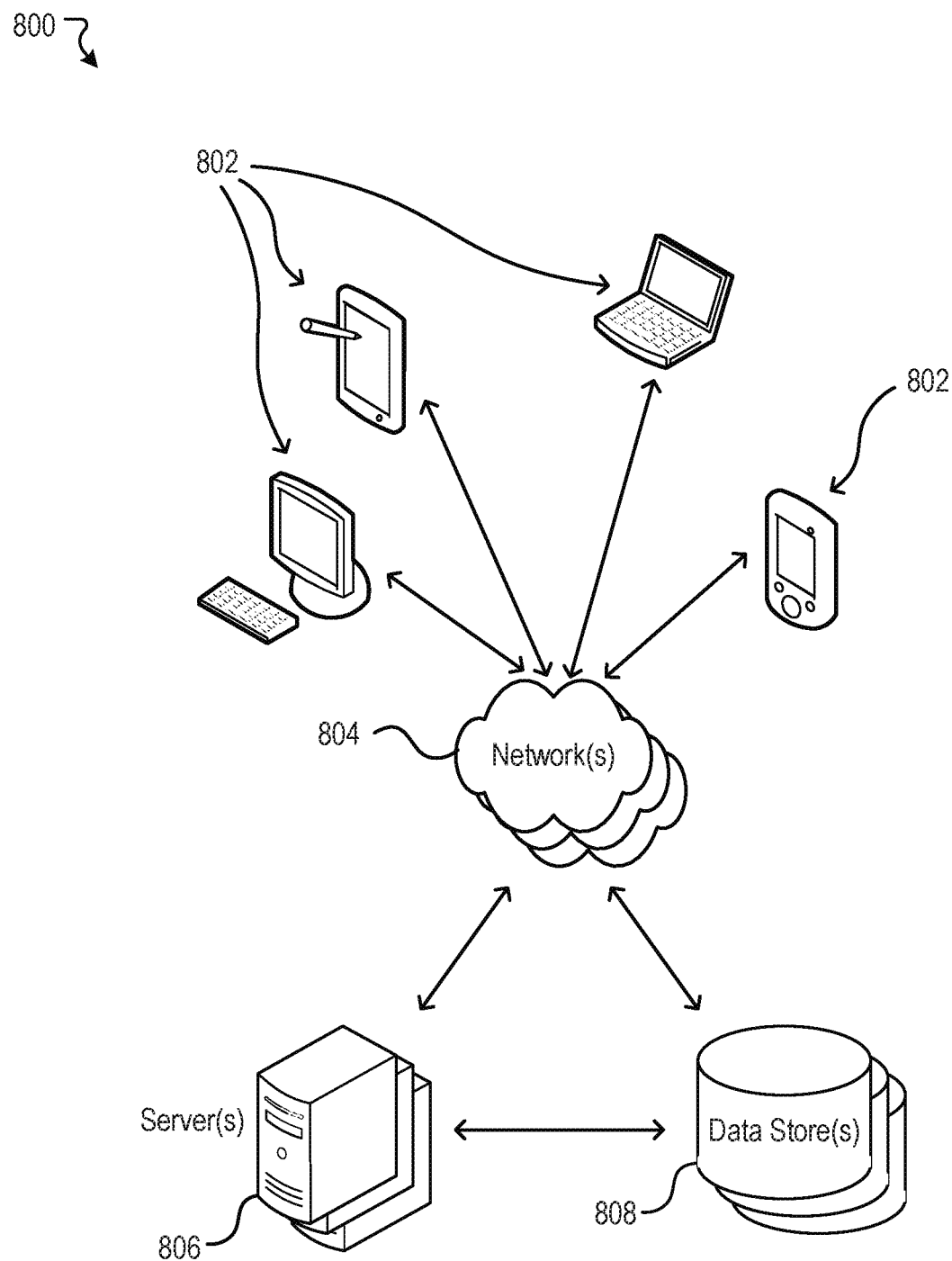
FIG. 8 illustrates a network environment in which various embodiments can be implemented.

As discussed, different approaches can be implemented in various environments in accordance with the described embodiments. For example, FIG. 8 illustrates an example network system embodiment (or network environment) 800 for implementing aspects in accordance with various embodiments. The example network system 800 can include one or more computing devices, computing systems, electronic devices, client devices, etc. (e.g., 802). In some instances, each of these devices (and/or systems) 802 can correspond to the computer system 700 in FIG. 7. The example network system 800 can also include one or more networks 804. Further, there can be one or more servers 806 and one or more data stores 808 in the network system 800.

As shown in FIG. 8, the one or more example computing devices (i.e., computing systems, electronic devices, client devices, etc.) 802 can be configured to transmit and receive information to and from various components via the one or more networks 804. For example, multiple computing devices 802 can communicate with one other via a Bluetooth network (e.g., 804). In another example, multiple computing devices 802 can communicate with one other via the Internet (e.g., 804). In a further example, multiple computing devices 802 can communicate with one other via a local area network (e.g., 804).

In some embodiments, examples of computing devices 802 can include (but are not limited to) personal computers, desktop computers, laptop/notebook computers, tablet computers, electronic book readers, mobile phones, cellular phones, smart phones, handheld messaging devices, personal data assistants (PDAs), set top boxes, cable boxes, video gaming systems, smart televisions, smart appliances, smart cameras, wearable devices, sensors, etc. In some cases, a computing device 802 can include any device (and/or system) having a processor. In some cases, a computing device 802 can include any device configured to communicate via the one or more networks 804.

Moreover, regarding the computing devices 802, various hardware elements associated with the computing devices 802 can be electrically coupled via a bus. As discussed above, elements of computing devices 802 can include, for example, at least one processor (e.g., central processing unit (CPU)), at least one input device (e.g., a mouse, keyboard, button, microphone, touch sensor, controller, etc.), and at least one output device (e.g., a display screen, speaker, ear/head phone port, tactile/vibration element, printer, etc.). The computing device 802 can also include one or more storage devices. For example, the computing device 802 can include optical storage devices, disk drives, and solid-state storage devices (e.g., random access memory ("RAM"), read-only memory ("ROM"), etc.). In another example, the computing device 802 can include portable or removable media devices, flash cards, memory cards, etc.

Further, the computing device(s) 802 can include a computer-readable storage media reader, a communications device (e.g., a modem, a network card (wireless or wired), an infrared communication device, etc.). The computer-readable storage media reader can be capable of connecting with or receiving a computer-readable storage medium. The computer-readable storage medium can, in some cases, represent various storage devices and storage media for temporarily and/or more permanently storing, interacting with, and accessing data. The communications device can facilitate in transmitting and/or receiving data via the network(s) 804.

In some embodiments, the computing device 802 can utilize software modules, services, and/or other elements residing on at least one memory device of the computing device 802. In some embodiments, the computing device 802 can utilize an operating system (OS) and/or a program. For example, the computing device 802 can utilize a web browsing application to interact with and/or access various data (e.g., content) via the network(s) 804. It should be understood that numerous variations and applications are possible for the various embodiments disclosure herein.

In some embodiments, examples of the one or more networks 804 can include (but are not limited to) an intranet, a local area network (LAN, WLAN, etc.), a cellular network, the Internet, and/or any combination thereof. Components used for implementing the network system 800 can depend at least in part upon a type(s) of network(s) and/or environment(s). A person of ordinary skill in the art would recognize various protocols, mechanisms, and relevant parts for communicating via the one or more networks 804. In some instances, communication over the network(s) 804 can be achieved via wired connections, wireless connections (WiFi, WiMax, Bluetooth, radio-frequency communications, near field communications, etc.), and/or combinations thereof.

In some embodiments, the one or more networks 804 can include the Internet, and the one or more servers 806 can include one or more web servers. The one or more web servers can be configured to receive requests and provide responses, such as by providing data and/or content based on the requests. In some cases, the web server(s) can utilize various server or mid-tier applications, including HTTP servers, CGI servers, FTP servers, Java servers, data servers, and business application servers. The web server(s) can also be configured to execute programs or scripts in reply to requests from the computing devices 802. For example, the web server(s) can execute at least one web application implemented as at least one script or program. Applications can be written in various suitable programming languages, such as Java®, JavaScript, C, C# or C++, Python, Perl, TCL, etc., and/or combinations thereof.

In some embodiments, the one or more networks 804 can include a local area network, and the one or more servers 806 can include a server(s) within the local area network. In one example, a computing device 802 within the network(s) 804 can function as a server. Various other embodiments and/or applications can also be implemented.

In some embodiments, the one or more servers 804 in the example network system 800 can include one or more application servers. Furthermore, the one or more applications servers can also be associated with various layers or other elements, components, processes, which can be compatible or operable with one another.

In some embodiments, the network system 800 can also include one or more data stores 808. The one or more servers (or components within) 806 can be configured to perform tasks such as acquiring, reading, interacting with, modifying, or otherwise accessing data from the one or more data stores 808. In some cases, the one or more data stores 808 can correspond to any device/system or combination of devices/systems configured for storing, containing, holding, accessing, and/or retrieving data. Examples of the one or more data stores 808 can include (but are not limited to) any combination and number of data servers, databases, memories, data storage devices, and data storage media, in a standard, clustered, and/or distributed environment.

The one or more application servers can also utilize various types of software, hardware, and/or combinations thereof, configured to integrate or communicate with the one or more data stores 808. In some cases, the one or more application servers can be configured to execute one or more applications (or features thereof) for one or more computing devices 802. In one example, the one or more applications servers can handle the processing or accessing of data and business logic for an application(s). Access control services in cooperation with the data store(s) 808 can be provided by the one or more application servers. The one or more application servers can also be configured to generate content such as text, media, graphics, audio and/or video, which can be transmitted or provided to a user (e.g., via a computing device 802 of the user). The content can be provided to the user by the one or more servers 806 in the form of HyperText Markup Language (HTML), Extensible HyperText Markup Language (XHTML), Extensible Markup Language (XML), or various other formats and/or languages. In some cases, the application server can work in conjunction with the web server. Requests, responses, and/or content delivery to and from computing devices 802 and the application server(s) can be handled by the web server(s). It is important to note that the one or more web and/or application servers (e.g., 806) are included in FIG. 8 for illustrative purposes.

In some embodiments, the one or more data stores 808 can include, for example, data tables, memories, databases, or other data storage mechanisms and media for storing data. For example, the data store(s) 808 can include components configured to store application data, web data, user information, session information, etc. Various other data, such as page image information and access rights information, can also be stored in the one or more data stores 808. The one or more data stores 808 can be operable to receive instructions from the one or more servers 806. The data stores 808 can acquire, update, process, or otherwise handle data in response to instructions.

In some instances, the data store(s) 808 can reside at various network locations. For example, the one or more data stores 808 can reside on a storage medium that is local to and/or resident in one or more of the computing devices 802. The data store(s) 808 can also reside on a storage medium that is remote from the devices of the network(s) 804. Furthermore, in some embodiments, information can be stored in a storage-area network ("SAN"). In addition, data useful for the computing devices 802, servers 806, and/or other network components can be stored locally and/or remotely.

In one example, a user of a computing device 802 can perform a search request using the computing device 802. In this example, information can be retrieved and provided to the user (via the computing device 802) in response to the search request. The information can, for example, be provided in the form of search result listings on a web page that is rendered by a browsing application running on the computing device 802. In some cases, the one or more data stores 808 can also access information associated with the user (e.g., the identity of the user, search history of the user, etc.) and can obtain search results based on the information associated with the user.

Moreover, in some embodiments, the one or more servers 806 can each run an operating system (OS). The OS running on a respective server 806 can provide executable instructions that facilitate the function and performance of the server. Various functions, tasks, and features of the one or more servers 806 are possible and thus will not be discussed herein in detail. Similarly, various implementations for the OS running on each server are possible and therefore will not be discussed herein in detail.

In some embodiments, various aspects of the present disclosure can also be implemented as one or more services, or at least a portion thereof. Services can communicate using many types of messaging, such as HTML, XHTML, XML, Simple Object Access Protocol (SOAP), etc. Further, various embodiments can utilize network communicational protocols, such as TCP/IP, OSI, FTP, UPnP, NFS, CIFS, etc. Examples of the one or more networks 804 can further include wide-area networks, virtual private networks, extranets, public switched telephone networks, infrared networks, and/or any combinations thereof.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments. Furthermore, reference in this specification to "based on" can mean "based, at least in part, on", "based on at least a portion/part of", "at least a portion/part of which is based on", and/or any combination thereof.

It should also be appreciated that the specification and drawings are to be regarded in an illustrative sense. It can be evident that various changes, alterations, and modifications can be made thereunto without departing from the broader spirit and scope of the disclosed technology.

Moreover, the language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   acquiring, by a computing system, a first calendar comprising a first set of one or more events associated with a first entity and a second calendar comprising a second set of one or more events associated with a second entity;
   determining, by the computing system, that a first event from the first set of one or more events conflicts with a second event from the second set of one or more events;
   generating, by the computing system, an aggregated calendar event for the first event and the second event, wherein the aggregated calendar event represents the first event and the second event;
   providing, by the computing system, the aggregated calendar event for presentation in an interface on a calendar client, wherein the calendar client is associated with an identifier;
   generating, by the computing system, an analytics report based at least in part on information associated with the calendar client and the identifier, wherein the information comprises whether the first event was added via the calendar client; and
   providing, by the computing system, the analytics report to the first entity.

2. The computer-implemented method of claim 1, wherein the information further comprises at least one of: whether the first event was removed via the calendar client, whether a reservation to the first event was made via the calendar client, whether a ticket to the first event was obtained via the calendar client, whether the first event was shared via the calendar client, or whether a link relating to the first event was accessed via the calendar client.

3. The computer-implemented method of claim 1, wherein the analytics report indicates at least one of: a quantity of unique users who are subscribed to the first calendar, a quantity of unique users who are subscribed to the first calendar during a specified time period, a quantity of users who unsubscribed from the first calendar during the specified time period, or a net quantity of users who subscribed to the first calendar.

4. The computer-implemented method of claim 1, wherein the analytics report indicates at least one of: a quantity of links in the first event that have received user engagement, a number of times the first event was added, or a number of times the first event was shared.

5. The computer-implemented method of claim 1, wherein the analytics report indicates that a user associated with the identifier is subscribed to the first calendar and the second calendar.

6. The computer-implemented method of claim 5, wherein the analytics report further indicates a quantity of unique users who are subscribed to the first calendar and the second calendar.

7. The computer-implemented method of claim 5, wherein the analytics report further indicates a quantity of new users who subscribed to the first calendar and the second calendar during a specified time period.

8. The computer-implemented method of claim 5, wherein the analytics report further indicates a quantity of links in the second event that have received user engagement.

9. The computer-implemented method of claim 5, wherein the analytics report further indicates a calendar identifier associated with the second calendar.

10. The computer-implemented method of claim 1, wherein the analytics report is generated based at least in part on whether a user associated with the identifier chooses to opt-in.

11. A system comprising:
    at least one processor; and
    a memory storing instructions that, when executed by the at least one processor, cause the system to perform a method comprising:
      acquiring a first calendar comprising a first set of one or more events associated with a first entity and a second calendar comprising a second set of one or more events associated with a second entity;
      determining that a first event from the first set of one or more events conflicts with a second event from the second set of one or more events;
      generating an aggregated calendar event for the first event and the second event, wherein the aggregated calendar event represents the first event and the second event;
      providing the aggregated calendar event for presentation in an interface on a calendar client, wherein the calendar client is associated with an identifier;
      generating an analytics report based at least in part on information associated with the calendar client and the identifier, wherein the information comprises whether the first event was added via the calendar client; and
      providing the analytics report to the first entity.

12. The system of claim 11, wherein the information further comprises at least one of: whether the first event was removed via the calendar client, whether a reservation to the first event was made via the calendar client, whether a ticket to the first event was obtained via the calendar client, whether the first event was shared via the calendar client, or whether a link relating to the first event was accessed via the calendar client.

13. The system of claim 11, wherein the analytics report indicates at least one of: a quantity of unique users who are subscribed to the first calendar, a quantity of unique users who are subscribed to the first calendar during a specified time period, a quantity of users who unsubscribed from the first calendar during the specified time period, or a net quantity of users who subscribed to the first calendar.

14. The system of claim 11, wherein the analytics report indicates at least one of: a quantity of links in the first event that have received user engagement, a number of times the first event was added, or a number of times the first event was shared.

15. The system of claim 11, wherein the analytics report indicates that a user associated with the identifier is subscribed to the first calendar and the second calendar.

16. A non-transitory computer-readable storage medium including instructions that, when executed by at least one processor of a computing system, cause the computing system to perform a method comprising:
   acquiring a first calendar comprising a first set of one or more events associated with a first entity and a second calendar comprising a second set of one or more events associated with a second entity;
   determining that a first event from the first set of one or more events conflicts with a second event from the second set of one or more events;
   generating an aggregated calendar event for the first event and the second event, wherein the aggregated calendar event represents the first event and the second event;
   providing the aggregated calendar event for presentation in an interface on a calendar client, wherein the calendar client is associated with an identifier;
   generating an analytics report based at least in part on information associated with the calendar client and the identifier, wherein the information comprises whether the first event was added via the calendar client; and
   providing the analytics report to the first entity.

17. The non-transitory computer-readable storage medium of claim 16, wherein the information further comprises at least one of: whether the first event was removed via the calendar client, whether a reservation to the first event was made via the calendar client, whether a ticket to the first event was obtained via the calendar client, whether the first event was shared via the calendar client, or whether a link relating to the first event was accessed via the calendar client.

18. The non-transitory computer-readable storage medium of claim 16, wherein the analytics report indicates at least one of: a quantity of unique users who are subscribed to the first calendar, a quantity of unique users who are subscribed to the first calendar during a specified time period, a quantity of users who unsubscribed from the first calendar during the specified time period, or a net quantity of users who subscribed to the first calendar.

19. The non-transitory computer-readable storage medium of claim 16, wherein the analytics report indicates at least one of: a quantity of links in the first event that have received user engagement, a number of times the first event was added, or a number of times the first event was shared.

20. The non-transitory computer-readable storage medium of claim 16, wherein the analytics report indicates that a user associated with the identifier is subscribed to the first calendar and the second calendar.

* * * * *